Dec. 27, 1966 T. H. HORN 3,295,106

POSITIVE-NEGATIVE MASK COMPARISON OF MULTIPLE IMAGES GENERATED BY OPTICAL TUNNEL MEANS

Filed March 11, 1964 2 Sheets-Sheet 1

INVENTOR.

TED H. HORN

BY Albert L. Jeffers

ATTORNEY

INVENTOR.
TED H. HORN
BY Albert L. Jeffers
ATTORNEY

United States Patent Office 3,295,106
Patented Dec. 27, 1966

3,295,106

POSITIVE-NEGATIVE MASK COMPARISON OF MULTIPLE IMAGES GENERATED BY OPTICAL TUNNEL MEANS

Ted H. Horn, Fort Wayne, Ind., assignor to DEK Processes, Inc., Fort Wayne, Ind., a corporation of Indiana Filed Mar. 11, 1964, Ser. No. 351,113
10 Claims. (Cl. 340—146.3)

This invention relates to electronic data processing systems, and more particularly to apparatus in a data processing system for electronically reading, recognizing and translating photographic records of printed matter and/or binary coded information.

As is known, systems have previously been devised for electrically "reading" printed items and/or binary code information and for converting such information into electrical intelligence which may be used in data processing apparatus. Most prior art systems of this type are electromechanical in nature, meaning that they employ mechanically movable scanning devices or recognition devices requiring mechanically moving parts. Also, previous reading systems usually required a close physical registration or indexing of the material to be read with respect to the scanning device.

The foregoing requirements of prior art reading systems make them somewhat cumbersome and more or less unsatisfactory. For example, any electromechanical system entails drives, bearings, electrical contacts and the like which might cause failure of the device. At best, any mechanical device is subject to breakdown eventually. Also, in previous systems of this type, it was common to move a recognition mask past the area containing the image to be recognized. In this respect, each possible item to be recognized was moved past the area containing the image until the correct item arrived, whereupon photocells or the like would indicate the existence of the correct printed item. Let us assume, for example, that the letter K was to be recognized and that the letter A was the first in line on the mask that was being moved past the image to be recognized in a prior art electromechanical system. Under these circumstances, recognition would not occur for that length of time which it took for the moving mask to move all the letters between A and K past the image to be recognized. Thus, electromechanical recognition devices of this type are inherently slow in operation. Finally, the necessity for a close physical registration of the material to be read with the scanning device in prior art systems always presented problems due to the inherent inaccuracies of the operator making the initial manual adjustment.

As an overall object, the present invention seeks to provide new and improved character recognition apparatus which overcomes the foregoing and other disadvantages of prior art devices of this type.

More specifically, an object of the invention is to provide character recognition apparatus which does not require an exact physical registration or indexing of the material to be read with respect to a scanning device.

Another object of the invention is to provide character recognition apparatus which utilizes no moving parts, but only static electrical components, thereby eliminating the problems encountered in electromechanical systems of the prior art.

The above and other objects and features of the invention will become apparent from the following detailed description taken in connection with the accompanying drawings which form a part of this specification, and in which.

Figure 1:
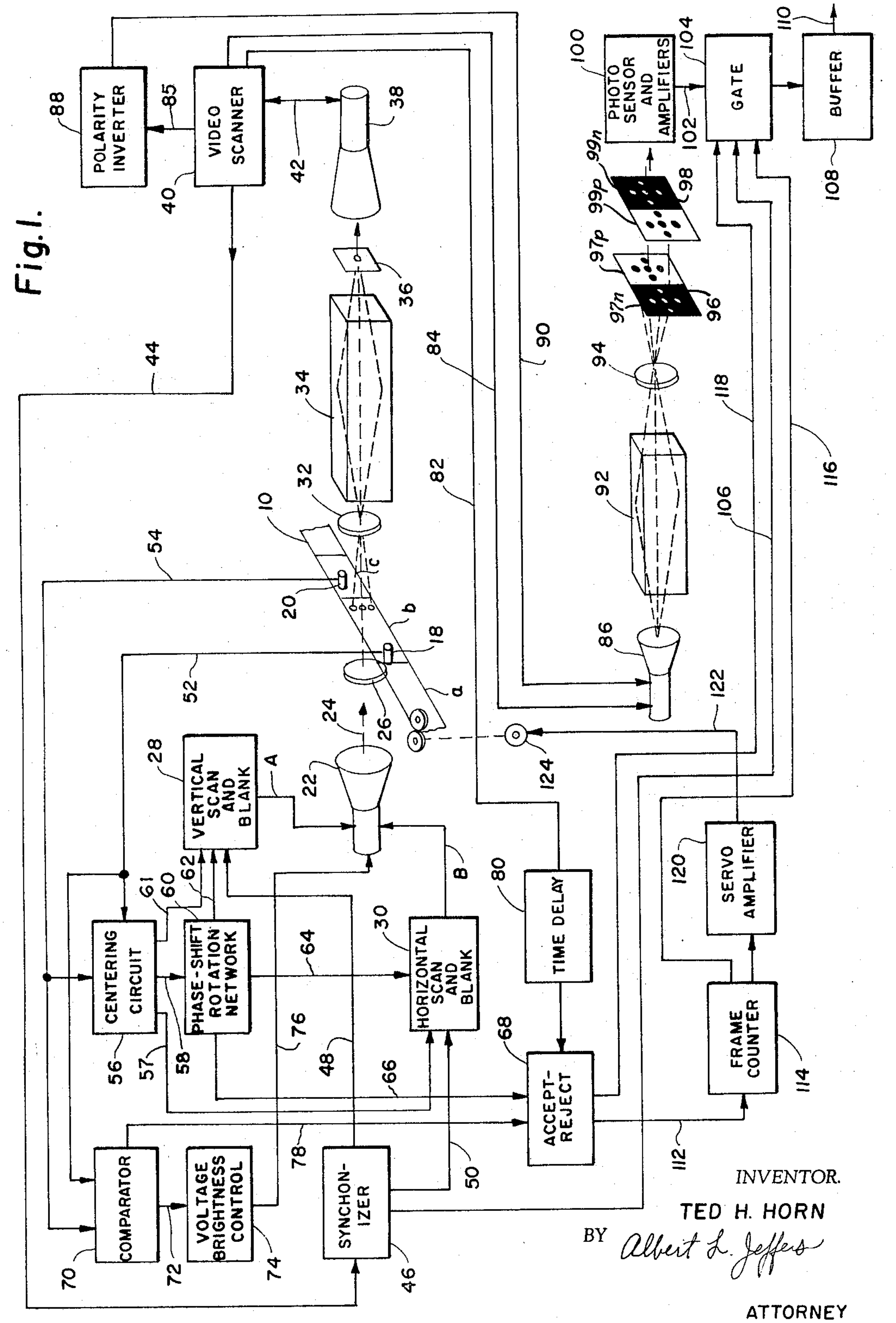
FIGURE 1 is a block schematic circuit diagram of the character recognition apparatus of the invention.
Figure 2:
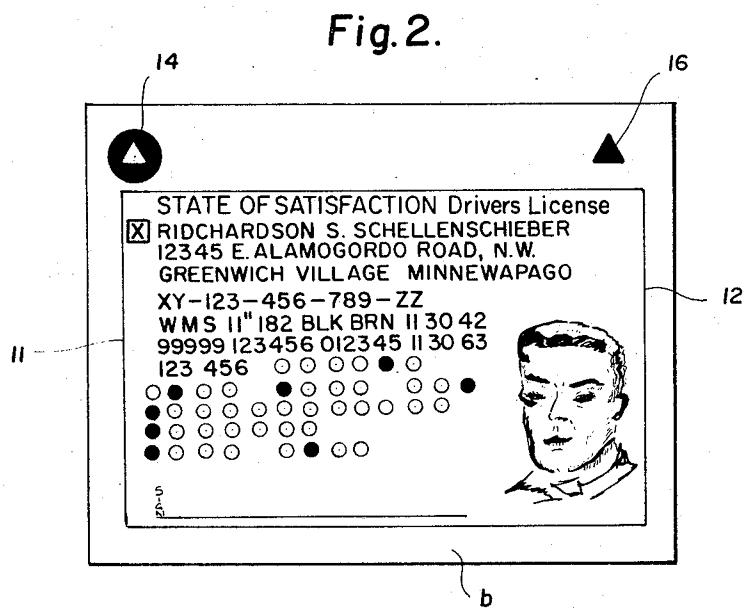
FIG. 2 is an illustration of one type of printed material and/or binary code information which may be read with the apparatus of the invention.

With reference now to the drawings, and particularly to FIG. 1, successive frames *a*, *b* and *c* on negative photographic film 10 each contain different records to be read. The positive of one such record, for example, is shown in FIG. 2 and comprises a driver's license having both binary code information at the bottom thereof as well as printed material at the top. Only that information contained within the inner outline 12 will be "read" by the recognition apparatus, hereinafter described in detail. The circles in the lower portion of the form are pre-scored in the original, positive document; and the black dots are punched out to produce digital information. The dots which are punched out, as well as the printed information will appear light-colored on the negative film 10. Although the shape of the pre-scored areas is shown as circular in FIG. 2, it should be understood that they may be of any shape. The triangular marks 14 and 16 on the top of the film 10 are contained in the frame *b* of the photographic film but do not apear in a positive print of the negative. These marks 14 and 16 are used in connection with photocells 18 and 20, respectively (FIG. 1), for the purpose of electrically registering each frame *a*, *b* or *c* with the scanning device to be described. The X on the left border of the form is typed into the space provided therefor to check the proper alignment of the original form in a typewriter, thereby insuring that the remaining typewritten characters will be properly indexed with respect to marks 14 and 16.

With reference, again, to FIG. 1, the film 10 is stationary during the scanning operation; and the frame *b*, for example, is scanned by a flying-spot scanner 22 which directs a light beam 24 through lens 26 onto the backside of the frame *b*. The scanner 22 causes the light beam 24 to scan the entire frame *b*, including marks 14 and 16, between lines 11 and 12. In this respect, the light beam 24 may, for example, start at the upper left-hand corner of the form shown in FIG. 2. The spot 24 has a vertical height slightly greater than the height of the letters or numerals printed on the form and a width substantially equal to the width of each letter or numeral. Assuming that the beam 24 starts at the upper left-hand corner, it may then proceed to the right until it reaches the line 12. At this point, it will "fly back" to the left edge 11 and scan the next line of printed material until it reaches the right edge of the frame at 12; whereupon it flies back and scans the third line, and so on.

Figure 3:
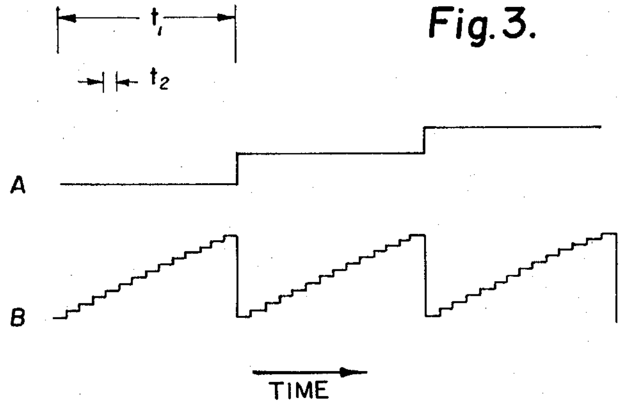
FIG. 3 is an illustration of waveforms appearing at various points in the circuit of FIG. 1.

The vertical and horizontal deflection coils for the flying spot scanner 22 are controlled by a vertical scan and blank circuit 28 and a horizontal scan and blank circuit 30, respectively. Each of the circuits 28 and 30 is adapted to produce staircase output voltages. The output voltage produced by vertical scan and blank circuit 28 may appear, for example, as waveform A in FIG. 3; whereas the output waveform of the horizontal scan and blank circuit 30 may appear as waveform B. It will be noted in FIG. 3 that during the time $t_1$, the voltage of waveform A is constant, thereby positioning the light beam 24 at a constant vertical position which will be assumed to be the top of the frame *b* as shown in FIG. 2. However, during the same time $t_1$, the horizontal waveform B increases in voltage in incremental steps. As a result, the light beam 24 is caused to traverse the frame *b* from left to right as viewed in FIG. 1 in increments. During each increment, which persists for the time $t_2$ shown in FIG. 3, the light beam is stationary and is positioned over one of the letters, numerals or other characters to be read. Consequently, the light beam moves from left to right, stopping at each letter or other character to be read for the time $t_2$. In the particular example given in FIG. 3, there are fourteen incremental voltage rises, meaning that the system is capable of "reading" fourteen separate letters or other characters from left to right along a horizontal line. As will be understood, however, this number may be increased or decreased to suit requirements.

After the light beam progresses from left to right along the first horizontal line in the manner described above, the voltage of waveform A increases and the voltage of wavefrom B "flies back" to its original value at the start of time $t_1$. Consequently, the light beam 24 is now shifted downwardly in an amount equal to the width of a horizontal line of the printing or other characters on the frame *b*, while waveform B again rises in incremental steps to move the light beam 24 across the frame *b* from left to right in incremental steps with the light beam stopping at each letter or character to be read.

The light beam 24, after passing through the film 10, is projected through a projection lens 32 and an optical tunnel 34 onto an image receiving plane 36. The tunnel 34 is known in the art, and comprises four substantially similar, plane reflective mirrors which are positioned to form a tunnel having a square cross section. This tunnel 34, in cooperation with the lens 32, provides multiple reflections so that an image of each character (as the character is illuminated by the light beam 24 and wherever the character may be located on the film 10) is produced at the center of the plane 36. The resulting image on plane 36 is focused onto the face of a TV camera pickup tube 38 such as a conventional vidicon or image orthicon. Thus, the camera tube 38 will have focused thereon successive images of the letters or characters to be read on the frame *b* shown in FIG. 2; and each of these images will persist on the face of the tube 38 for a time equal to time $t_2$ shown in FIG. 3.

The camera tube 38 is controlled by means of a video scanner circuit 40 which causes the electron beam of the camera tube 38 to effect a full-frame scan of the image focused on its face during the time $t_2$. Thus, the camera tube 38, in effect, "reads" the image of each letter or other character which is projected into its face; and these images are projected in sequence starting from the upper left-hand corner of the form shown in FIG. 2 and progressing from left to right.

In order for the camera tube 38 to "read" each individual letter or character in sequence it is, of course, necessary to synchronize the electron beam of the camera tube 38 with respect to the light beam 24 such that a full-frame scan of the tube 38 will be effected during the time that the beam 24 is on a single letter or character to be read. Otherwise, if the two are not synchronized, the light beam 24 may shift from one letter or character to the next during the scanning cycle of the camera tube 38, in which case the video signal on lead 42 generated by the camera tube 38 would be unintelligible. For this purpose, the video scanner circuit 40 is connected through lead 44 to a synchronizing circuit 46. The synchronizing circuit 46, in turn, is connected through lead 48 to the vertical scan and blank circuit 28; and is also connected through lead 50 to the horizontal scan and blank circuit 30, the arrangement being such that the circuit 40 will trigger the synchronizing circuit 46 to cause the light beam 24 to jump from one letter or character to the next just before the camera tube 38 starts its full-frame scan.

It will be appreciated that in order for the system to operate properly, the light beam 24 must be indexed with respect to the printed material on the frame *b*. Otherwise, the light beam 24 may be between two printed characters on the form when it stops rather than on one printed character with the result that partial images of two adjacent characters will be focused onto the face of the camera tube 38.

Therefore, in accordance with the present invention, the light beam 24 is properly indexed with respect to the printed material on the form electrically and without the necessity for any manual or physical positioning of the film 10. Referring again to FIG. 2, the triangular marks 14 and 16 will be adjacent the photocells 18 and 20; and as the flying spot or light beam 24 scans from left to right across the top of the form it will intersect both of the triangular marks 14 and 16. It will be noted that the one mark is, in effect, a negative of the other. The photo sensors 18 and 20 are adjusted so as to have identical electrical responses. As registration marks 14 and 16 on the document (FIG. 2) are in effect negatives of each other, the photo sensors 18 and 20 will produce opposite out-puts when proper indexing is achieved. In order to prevent erroneous results from films of varying density or contrast, the centering circuit 56 acts as a hunt circuit, the out-put of which shifts the trace pattern on scanner 22. This output is applied through leads 57, 61 to the horizontal and vertical scan units 30 and 28 respectively to cause shifting in the horizontal and/or vertical direction until the signal difference through leads 52 and 54 into 56 has reached maximum value.

Simultaneously, part of the error out-put of 56 is fed through lead 58 to unit 60. The out-put of which through leads 62 and 64 and units 28 and 30 causes the trace pattern to be rotated until, again, maximum signal difference in leads 52 and 54 is obtained.

If the maximum signal difference in leads 52 and 54 is below a certain predetermined value, the phase shift network 60 will produce a signal on lead 66 indicating that the misalignment or mis-registration of the frame *b* is above or below permissible limits. This signal on lead 66, in turn, actuates an accept-reject circuit 68 to disable the character recognition apparatus in a manner hereinafter described. The circuit 68 may be any suitable signal level sensing device or circuit that produces a disabling signal in response to the signal level exceeding a predetermined magnitude.

The signals on leads 52 and 54 are applied to a comparator 70 where these signals are compared to certain fixed and predetermined levels. This produces an output voltage on lead 72 connected to a voltage-brightness control circuit 74. The circuit 74, in turn, is connected via lead 76 to the scanner 22; and the signal on lead 76 serves as a bias voltage which modulates the intensity of the flying spot or light beam 24 such that the net light output through the photographic material 10 will be uniform, regardless of the overall optical density of the film. The comparator 70 is also connected through lead 78 as shown to the accept-reject circuit 68 such that when the intensity is above or below predetermined maximum limits, the circuit 68 will be actuated to disable the character recognition apparatus. Thus, the apparatus will be automatically disabled if:

(1) The misalignment of the material to be scanned is above or below predetermined limits.

(2) The net light output through the photographic material 10 is above or below predetermined maximum limits, or (3) The density difference between 14 and 16 is below a predetermined limit.

A time delay circuit 80, triggered by the video scanner circuit 40 through lead 82, disables the accept-reject circuit 68 until the flying spot 24 has scanned at least one complete frame. This gives the flying spot 24 time in which to pass over the registration marks 14 and 16 so as to enable the comparator 70 to adjust the brightness and also to enable circuits 56 and 60 to adjust the position of the flying spot for correct indexing. However, after one complete scan, circuit 80 will enable the accept-reject circuit 68.

Referring, again, to the video scanner 40, the video output signal from the camera tube 38 is applied via lead 84 to a cathode ray tube 86. At the same time, the video output signal is applied via lead 85 to a polarity inverter 88 which will produce a second video signal on lead 90 inverted in polarity with respect to that on lead 84. In this manner, a positive and negative image of the letter or other character focused onto the face of the pickup tube 38 will be displayed side-by-side on the face of the cathode ray tube 86. These positive and negative images on the face of the tube 86 are focused through a second optical tunnel 92 and focusing lens 94 onto a ground-glass screen 96 or the like which, by operation of the tunnel 92, displays multiple sets of images of each scanned letter or other character on its face. The second tunnel 92 may be similar or identical to the tunnel 34, but is arranged to operate in reverse fashion. For a single object, the tunnel 92 produces, through multiple reflections, a plurality of outwardly extending sets of images. These images extend horizontally outward because of the reflections against the side walls of the tunnel 92, and extend vertically outward because of the reflections against the top and bottom walls of the tunnel 92. FIGURE 1 shows only one set of positive images **97*p* which comprises an inverted-reverted image at the center, two inverted images (above and below the inverted-reverted image), and two reverted images (right and left of the inverted-reverted image); and one set of negative images 97*n* which comprises an inverted-reverted image at the center, two inverted images (above and below the inverted-reverted image), and two reverted images (right and left of the inverted-reverted image). The number of sets of images appearing on the screen 96 is, of course, determined by the number of reflections in tunnel 92 and the field of coverage of the lens 94**. While the number of sets of images required is determined by the number of characters to be read, it is preferable that each set of images have the positive and negative images of each character for the device to perform as intended. In this respect, the term "different-type" images is used in the following claims as a generic definition of two or more images of the same character.

A recognition mask 98 is provided with a plurality of sets of masks. Each set of masks has appropriate positive configurations (inverted-reverted, inverted, and reverted) and negative configurations (inverted-reverted, inverted, and reverted) for each of the characters to be recognized. The mask 98 is placed between the screen 96 and a bank of photosensing devices and their associated amplifiers 100. Each set of masks for each letter or character has its positive and negative configurations arranged in the proper position for the negative and positive images respectively. The sets of masks are positioned to correspond to the position of respective sets of images. FIGURE 1 shows one set of negative masks **99*n* correspondingly positioned behind the positive images 97*p*, and one set of positive masks 99*p* correspondingly positioned behind the negative images 97*n*. However, there are a plurality of sets of masks, and there is one respective set of images projected on each set of masks simultaneously or at the same. Since each of the sets of the recognition masks contains positive and negative configurations of all letters or other characters to be recognized, the bank 100 contains a number of photosensors equal to the number of characters or letters to be recognized. Each of these photosensors is positioned to respond to light passing through any one of the masks of a respective set of masks. By this arrangement, portions of the optical signal from the cathode ray tube 86 will penetrate the mask 98 at all locations except that which matches in configuration the display on the face of tube 86. Consequently, all photosensors in bank 100, except the one aligned with the set of masks providing a dark area, will produce an output, thereby recognizing by position the character scanned by the flying spot or light beam 24. The one photosensor in the dark area produces no output, the condition which indicates the letter or character scanned. Thus, a single mask with a plurality of sets of masks can identify each sequentially scanned character. The output signal from the photocells is applied via leads, schematically illustrated at 102, to a gating circuit 104 which also receives a signal from the synchronizing circuit 46 on lead 106. The signal on lead 106 is indicative of the geometrical location of the letter or character just scanned by virtue of the fact that the horizontal and vertical sweep signals from the video scanner 40 as applied to the camera tube 38** give this information.

It will be remembered that a signal appears at the output of time delay circuit 80 upon the completion of a full-frame sweep of the flying spot or light beam 24. This signal is applied through the accept-reject circuit 68 and lead 112 to a frame counter 114 and from there to lead 116 to the gating circuit 104. The frame counter thus counts the number of complete negative frames on film 10 which have been scanned. In addition, at the completion of each complete frame scan, it applies to gate 104 a signal indicative of the frame which has been scanned. The combined information comprising the character recognized, its location in a frame and the frame in which it appeared is now applied through a buffer stage 108 and appears at output 110 which is connected to a data processing unit, not shown. The gate 104 is normally enabled to pass signals from element 100 as well as those on leads 106 and 116. If, however, the intensity and/or indexing of the frame *b* is above or below the aforesaid predetermined maximum limits, a signal appears on lead 118 which disables the gating circuit 104 in which case the information is not passed to the buffer stage 108. It is in this manner that the apparatus is automatically disabled when the alignment or light intensity is not within permissible limits.

Similarly, after the frame counter 114 has counted a predetermined number of full-frame sweeps of the light beam 24, it actuates a servo amplifier 120 to drive, through lead 122, a frame-advance servomotor 124 to advance the film 10 in the direction of arrow 126 to the next successive frame *c* to be read. At this point, the foregoing process is repeated and the characters or letters on frame *c* read in the same manner as they were in the case of frame *b*. Thus, successive ones of the frames on film 10 will be automatically read in succession without the necessity for any manual or physical indexing of the film.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In character recognition apparatus, the combination comprising means for scanning a stationary member having characters of equal size uniformly spaced thereon in successive parallel rows with a light beam which scans each successive row in sequence, said light beam being of a size to illuminate only a single character in a row at any one time with the light beam being advanced along each row in successive steps such that it will remain stationary on one character for a predetermined period of time before advancing to the next successive character, means for indexing said light beam with respect to the equally-spaced characters including registration marks on said stationary member and a photocell associated with each registration mark and adapted to produce an output signal indicative of correct registration only when the light beam and said stationary member are properly positioned with respect to each other such that the light beam will be on a single character at any one time, an electron-optics device for full-frame scanning with an electron beam an image of each successive character while it is illuminated by the light beam to produce a video signal representative of the image scanned, means responsive to said video signal for producing visible different-type images of each successive character scanned, a plurality of mask devices arranged to be compared with said different-type images, and means including photosensitive devices operatively associated with said mask devices for producing successive output signals indicative of said successive characters scanned by the electron-optics device.

2. The character recognition apparatus of claim 1 wherein said means responsive to said video signal comprises an optical tunnel, and wherein said photosensitive devices comprise a separate photosensitive device associated with each of said mask devices.

3. The character recognition apparatus of claim 1 wherein said plurality of mask devices simultaneously receive said different-type images, with each of said mask devices matching the different-type images of an associated single one of the characters to be scanned.

4. The character recognition apparatus of claim 1 wherein said plurality of mask devices comprise a plurality of sets of masks arranged in a relationship to simultaneously receive a respective set of different-type images, with each of said sets of masks matching the different-type images of an associated one of the characters to be scanned.

5. In character recognition apparatus, the combination comprising means for scanning a stationary member having characters arranged thereon in successive parallel rows with a light beam which scans each successive row in sequence, said light beam being of a size to illuminate only a single character in a row at any one time with the light beam being advanced along each row in successive steps such that it will remain stationary on one character for a predetermined period of time before advancing to the next successive character, a plurality of registration marks on said stationary member, said registration marks being scanned by said light beam and being arranged on said member at predetermined locations with respect to the characters thereon, a photocell device associated with each of said registration marks adapted to produce an output signal when its associated registration mark is illuminated, the output signal from each photocell being dependent upon the positioning of said stationary member with respect to the scanning means, means for electrically comparing the signals produced by said photocell devices, means for effecting full-frame scanning of said light beam and including horizontal deflection means and vertical deflection means, means responsive to the output of said comparing means for positioning the frame scanned by said light beam such that the light beam will illuminate only a single character in a row at any one time, an electron-optics device for full-frame scanning with an electron beam an image of each successive character while it is illuminated by the light beam to produce a video signal representative of the image scanned, means responsive to said video signal for producing visible different-type images of each character scanned, and means including mask means and photosensitive devices which view the visible different-type images through the mask means for deriving an output signal indicative of the character scanned.

6. The character recognition apparatus of claim 5 wherein said means responsive to said video signal comprises an optical tunnel, and wherein said photosensitive devices comprise a separate photosensitive device associated with each of said mask devices.

7. The character recognition apparatus of claim 5 wherein said plurality of mask devices simultaneously receive said different-type images, with each of said mask devices matching the different-type images of an associated single one of the characters to be scanned.

8. The character recognition apparatus of claim 5 wherein said plurality of mask devices comprise a plurality of sets of masks arranged in a relationship to simultaneously receive a respective set of different-type images, with each of said sets of mask matching the different type of an associated one of the characters to be scanned.

9. The character recognition apparatus of claim 5 wherein the output signals from said photocell devices are compared to produce an electrical signal which controls the intensity of said light beam.

10. The character recognition apparatus of claim 5 and including means operable when the output of said comparator exceeds a predetermined magnitude for disabling said means for producing an output signal indicative of the character scanned.

References Cited by the Examiner

UNITED STATES PATENTS

| | | | |
|---|---|---|---|
| 2,754,360 | 7/1956 | Dersch | 340—146.3 |
| 2,898,576 | 8/1959 | Bozeman | 340—146.3 |
| 2,919,425 | 12/1959 | Ress et al. | 340—146.3 |
| 2,983,822 | 5/1961 | Brouillette | 340—146.3 |
| 2,986,643 | 5/1961 | Brouillette | 340—146.3 |
| 2,994,779 | 8/1961 | Brouillette | 340—146.3 |
| 3,111,647 | 11/1963 | Heizer | 340—146.3 |
| 3,213,422 | 10/1965 | Fritz et al. | 340—146.3 |
| 3,221,301 | 11/1965 | Moyroud | 340—146.3 |

MAYNARD R. WILBUR, *Primary Examiner.*

MALCOLM A. MORRISON, *Examiner.*

J. E. SMITH, *Assistant Examiner.*